March 8, 1932.  C. McG. SYKES  1,848,584
WEIGHING AND COUNTING SCALE
Filed Oct. 16, 1930  2 Sheets-Sheet 1
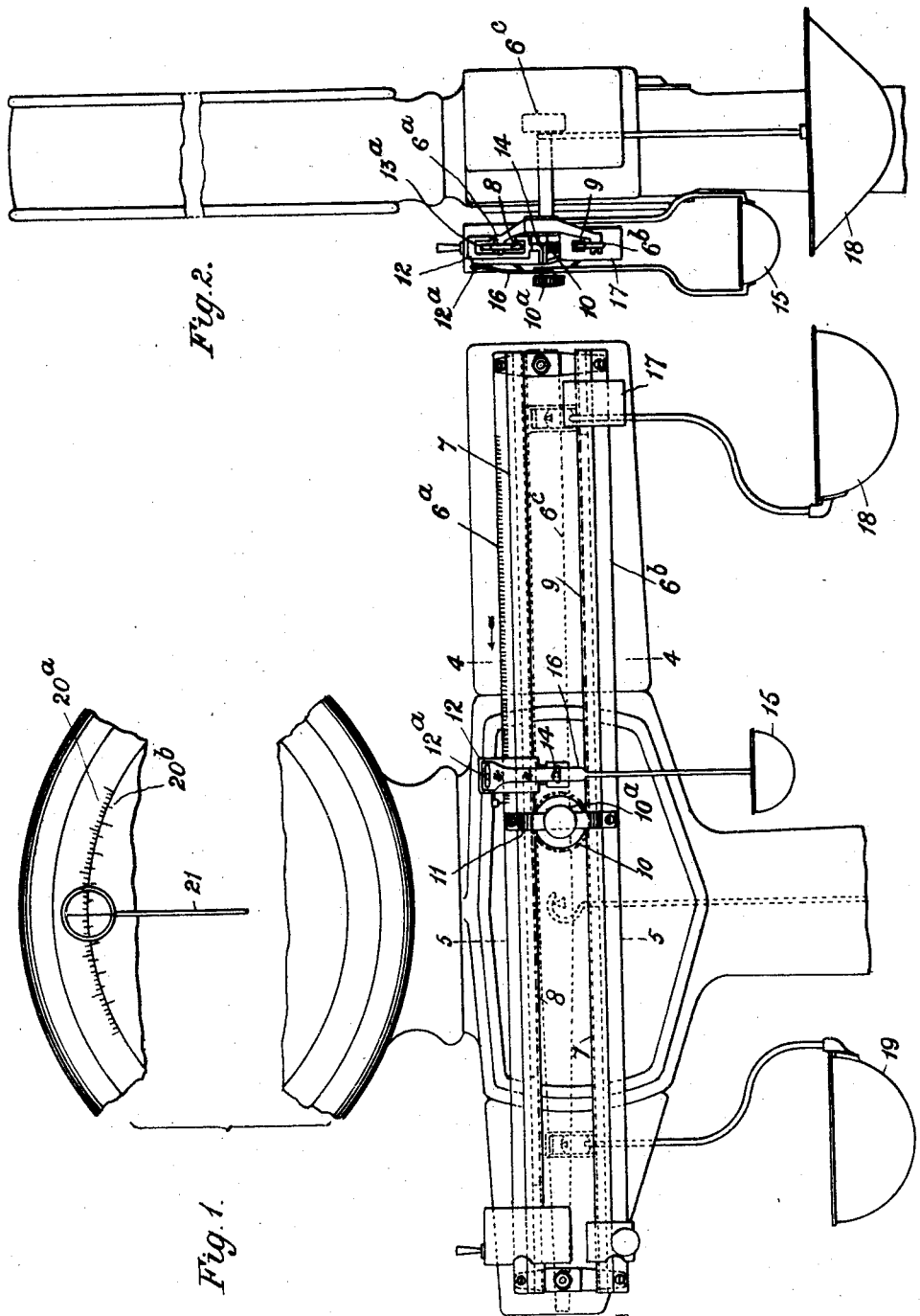
Inventor:—
Cameron McG. Sykes
by George E. Folkes,
his Attorney March 8, 1932.   C. McG. SYKES   1,848,584
WEIGHING AND COUNTING SCALE
Filed Oct. 16, 1930   2 Sheets-Sheet 2
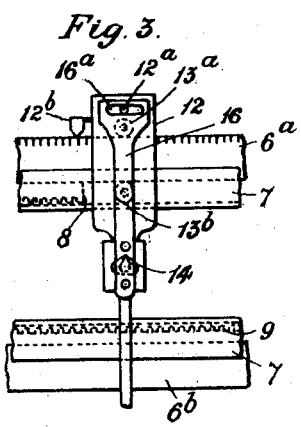
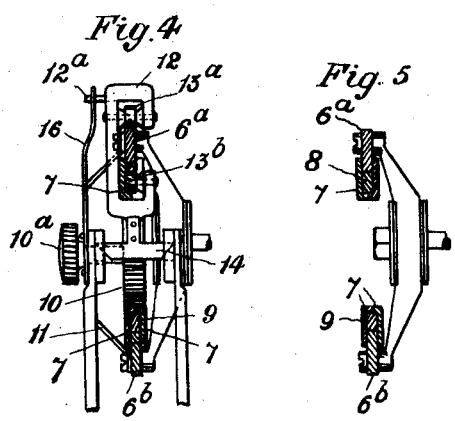
Inventor:—
Cameron McG. Sykes
by George E. Folkes,
his Attorney Patented Mar. 8, 1932

1,848,584

UNITED STATES PATENT OFFICE

CAMERON McGREGOR SYKES, OF SOHO FOUNDRY, BIRMINGHAM, ENGLAND, ASSIGNOR TO W. & T. AVERY LIMITED, OF SOHO FOUNDRY, BIRMINGHAM, ENGLAND

WEIGHING AND COUNTING SCALE

Application filed October 16, 1930, Serial No. 489,147, and in Great Britain December 31, 1929.

This invention has reference to improvements in or relating to weighing and counting scales and is concerned particularly with counting scales of the kind embodying two ratio pans one of which is employed for determining the odd number of a count and which scales are capable also of being employed as ordinary weighing scales.

The invention consists of an improved weighing and counting scale of the kind hereinbefore referred to and wherein an automatic weight indicating mechanism is combined with a steelyard mechanism characterized in that the odd numbers of a count are determined by a ratio pan which is supported from a weighing lever and capable of being traversed in a longitudinal direction away from and toward the fulcrum of the said weighing lever as required, the traverse of the said ratio pan being capable of being effected when the pan is empty without affecting the equilibrium of the scale.

The invention will now be described with particular reference to the accompanying sheets of drawings which illustrate the invention in its application to a platform weighing and counting scale of a known kind wherein the weighing platform is connected to an automatic weight indicating mechanism through a steelyard which has connected thereto a pair of parallel tare beams.

In the drawings:—

Figure 1 is a front elevation of sufficient of the scale as is necessary to an understanding of the invention.

Figure 2 is an end elevation of the portion of the scale illustrated in Figure 1 looking in the direction of the arrow in the said figure.

Figure 3 is a detail view in front elevation illustrating the method of mounting the odd units pan.

Figure 4 is a transverse vertical section taken on the plane 4—4 Figure 1 looking in the direction of the arrow in the said figure and omitting parts of the apparatus where desirable for the sake of clearness, and Figure 5 is a similar view to Figure 4 but with the section taken on the plane indicated by the line 5—5 Figure 1.

In the embodiment of the invention illustrated the tare beams $6^a$ $6^b$ are extended more to one side than is usual with weighing scales of the kind referred to and the said beams have screwed thereto L-shaped casings 7 which in conjunction with the adjacent edges of the tare beams constitute slideways for a pair of racks 8 and 9 which are oppositely disposed relatively to the fulcrum of the steelyard. These casings 7 are cut away adjacent to the centre to enable the teeth of the racks 8 and 9 to mesh with the teeth of a common pinion 10 which is rotatably mounted in bearings carried by a bracket 11 fixed to the tare beams $6^a$ $6^b$ the said pinions 10 being provided with an outwardly projecting spindle on which is mounted a knob $10^a$ whereby the said spindle may be rotated.

Attached to the upper rack 8 is a shackle 12 which embraces the upper tare beam $6^a$ and has rotatably mounted in its upper end a roller $13^a$ adapted to run on the upper edge of the said tare beam $6^a$ and in the lower end a roller $13^b$ adapted to run on the flange of the front casing 7. The lower end of the shackle 12 carries a knife edge 14 upon which is mounted bearings carried by straps which carry a small units pan 15. Fixed to the front of the units pan 15 is an upwardly directed member 16 which is provided adjacent to its upper end with a slot $16^a$ which cooperates with a pin $12^a$ fixed to and projecting outwardly from the shackle 12 said pin and slot serving to limit the degree of swinging motion permitted to the units pan 15. The shackle 12 is provided with an index $12^b$ which co-operates with graduations on the face of the tare beam $6^a$.

The right hand portion of the rear section of the casing 7 secured to the upper tare beam $6^a$ is cut away to permit of the movement of the shackle 12 the edge of the cut away section serving as an abutment for the shackle 12 when the units pan 15 is in the zero position.

The face line of the fulcrum knife edge of the steelyard $6^c$ is coincident with the face line of the knife edge 14 when the units pan 15 is in the zero position.

The racks 8 and 9 are arranged so that the moment of the upper rack 8 about the fulcrum of the steelyard 6ᶜ is equal and opposite to the moment of the lowermost rack 9. The weight of the shackle 12 and the units pan 15 about this fulcrum are counterbalanced by the weight 17 mounted on and secured to the lower rack 9.

Depending from the steelyard 6ᶜ is a second ratio pan 18 the position of which is fixed relatively to the fulcrum of the steelyard at a leverage of 71 to 1. The other arm of the steelyard has depending therefrom a fixed ratio pan 19 which has a leverage of 72 to 1.

The weight dial of the automatic indicating mechanism is provided with two separate rings of graduations 20ᵃ 20ᵇ one corresponding to weights of a relatively heavy order and the other to weights of a lighter order.

The scale is operated in the following manner:—

The receptacle in which the articles are to be placed is deposited on the weighing platform and tared in the usual manner.

The articles to be counted are then placed in the receptacle upon the weighing platform and the weight noted on the major weight chart of the automatic weight indicating mechanism. One or more of the articles are then placed in the fixed ratio pan 18 until the indicator 21 returns to zero when the number of the count is obtained as half a gross for each article in the pan 18.

If an exact zeroization is not obtained by placing articles in the pan 18 the odd dozens and units are determined by placing one article in the shiftable ratio pan 15 and traversing the said pan 15 away from the fulcrum of the steelyard 6ᶜ by rotating the pinion 10 by means of the knob 10ᵃ until the indicating pointer of the weight indicating mechanism returns to zero when the graduation on the upper tare bar 6ᵃ at which the ratio shiftable pan 15 registers with the indicating pointer 21 in the zero position indicates the odd numbers of the articles.

The count includes the articles in the pans 15 and 18 and on the weighing platform.

The pan 19 may be employed for weighing articles of a relatively light weight in which case the articles are placed in the said pan and the weight read off on the graduations on the chart of lower weight capacity.

The pan 19 may also be used for determining the weight of half grosses of articles by placing one or more articles in the pan 19 when the weight registered on the dial is the weight of the number of half grosses represented by the number of articles in the pan 19.

It will be appreciated that by employing a pair of oppositely moving racks 8 and 9 which mesh with a common pinion 10 the shiftable pan 15 may be moved into and allowed to remain in any position when empty without affecting the equilibrium of the scale.

A weighing and counting scale constructed as hereinbefore described is simple in construction, efficient in operation and capable of being embodied with existing forms of weighing and counting scales without necessitating any material alteration thereto.

What I claim is:—

1. A weighing and counting scale embodying a steelyard, an automatic weight indicating mechanism connected to said steelyard, a ratio pan depending from one arm of said steelyard, a pair of rack bars connected to both arms of the steelyard and capable of sliding in opposite directions longitudinally of said steelyard, a common pinion adapted to mesh with the teeth of the rack bars, means for rotating the said pinion, a units pan for determining the odd numbers of units of a count suspended from one of said rack bars, means for limiting the degree of swinging movement permitted to said units pan and means carried by the other rack bar for counterbalancing the units pan so that the equilibrium of the scale is unaffected if the units pan is traversed when empty.

2. A weighing and counting scale embodying a steelyard, an automatic weight indicating mechanism connected to said steelyard, a ratio pan depending from one arm of said steelyard, a pair of parallel longitudinally disposed tare bars, connected to both arms of the steelyard one of which bars bears graduations thereon, casings connected to said tare bars, rack bars slidably mounted within said casings, a pinion adapted to mesh with the teeth of the rack bars, means for rotating the said pinion so as to move the rack bars simultaneously in opposite directions, a runner connected to one of said rack bars and adapted to travel on one of the tare bars, a pan for determining the odd numbers of units of a count pivotally suspended from said runner, an index carried by the runner and adapted to register with the aforesaid graduations and means carried by the other rack bar for counterbalancing the odd numbers and units pan and runner so that the equilibrium of the scale is unaffected if the odd numbers and units pan is traversed when empty.

3. A weighing and counting scale embodying a steelyard, an automatic weight indicating mechanism connected to said steelyard and incorporating two charts one graduated in weights of a major order and one in weights of a minor order, a ratio pan depending from one arm of the steelyard and adapted to co-operate with one of said charts, a pan depending from the other arm of the said steelyard and adapted to co-operate with the other of the said charts, a pair of longitudinally disposed tare bars connected to both arms of the steelyard one of which bars bears graduations thereon, L-shaped casings connected to said tare bars, a pair of rack bars slidably mounted between the internal faces of the said casing and the adjacent faces of the tare bars, a pinion adapted to mesh with the teeth of the rack bars, means for rotating the pinion whereby the rack bars may be traversed simultaneously in opposite directions, a runner fixed to one of the rack bars and adapted to travel on the tare bar carrying the rack bar to which the runner is connected, an odd number and units pan pivotally suspended from the runner, an index carried by the runner and adapted to co-operate with the aforesaid graduations and means carried by the other rack bar for counterbalancing the odd number and units pan and the runner so that the equilibrium of the scale is unaffected when the pan is traversed when empty.

In testimony whereof I have signed my name to this specification.

CAMERON McGREGOR SYKES.